May 27, 1924. 1,495,804

A. J. ROBERTS

WINDMILL

Filed March 13, 1923    2 Sheets-Sheet 1

Inventor
A. J. Roberts

By Philip A. T. Terrell
Attorney

May 27, 1924.

A. J. ROBERTS

WINDMILL

Filed March 13, 1923    2 Sheets-Sheet 2

1,495,804

Inventor
A. J. Roberts

By Philip A. H. Sewell
Attorney

Patented May 27, 1924.

1,495,804

UNITED STATES PATENT OFFICE.

AMMI J. ROBERTS, OF GREGORY, SOUTH DAKOTA.

WINDMILL.

Application filed March 13, 1923. Serial No. 624,861.

*To all whom it may concern:*

Be it known that I, AMMI J. ROBERTS, a citizen of the United States, residing at Gregory, in the county of Gregory and State of South Dakota, have invented certain new and useful Improvements in Windmills, of which the following is a specification, reference being had therein to the accompanying drawings.

The invention relates to windmills, and has for its object to provide, in combination with a windmill, means whereby power from the reciprocating piston rod may be utilized for driving a line shaft. Also to provide means whereby the speed of the wheel may be controlled for regulating the speed of rotation of the line shaft.

A further object is to provide an endless sprocket chain extending over a sprocket carried by the line shaft, which sprocket chain is continuously rotated in one direction by pivoted dogs carried by a frame, which reciprocates with the piston rod, thereby imparting rotation to the line shaft.

A further object is to provide centrifugally controlled clutch means carried by the line shaft for rotating a drum loosely mounted on the line shaft and consequently the cable means controlling the speed of the windmill.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
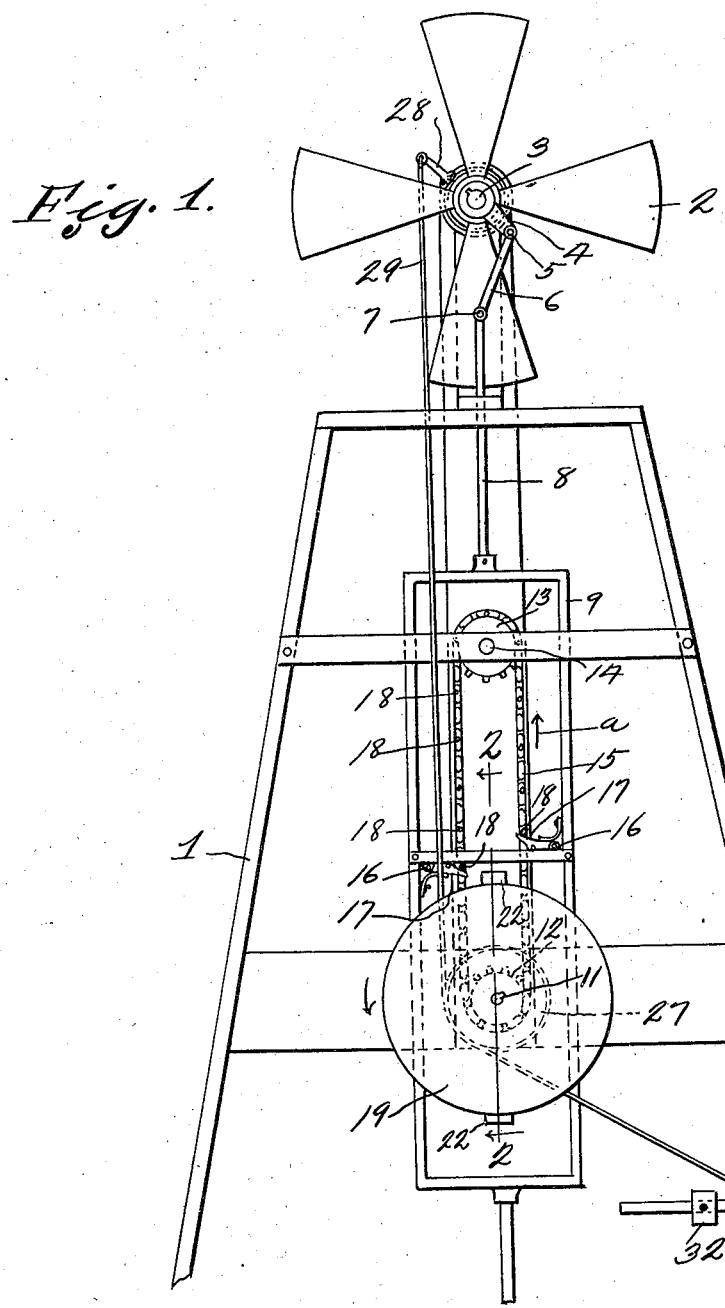
Figure 1 is a front elevation of a windmill, showing the shaft driving mechanism applied thereto.
Figure 2:
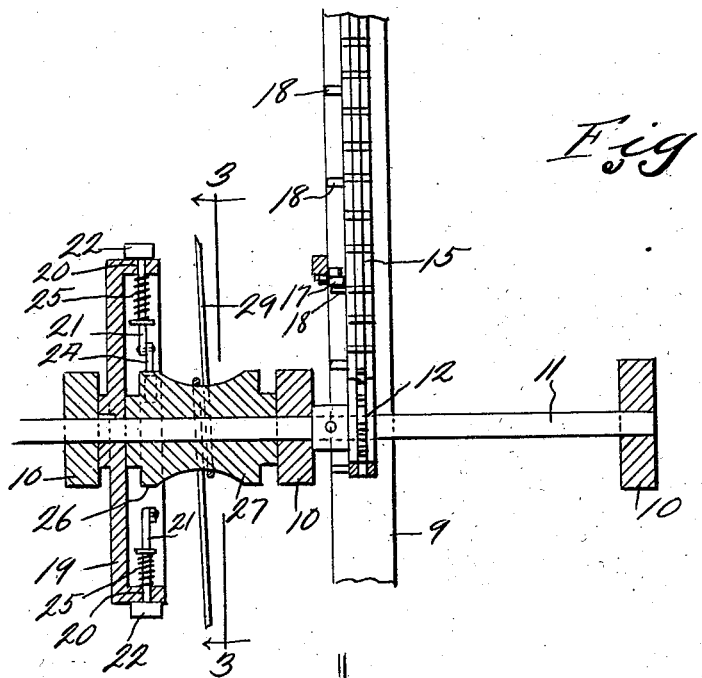
Figure 2 is a vertical transverse sectional view taken on line 2—2 of Figure 1.
Figure 3:
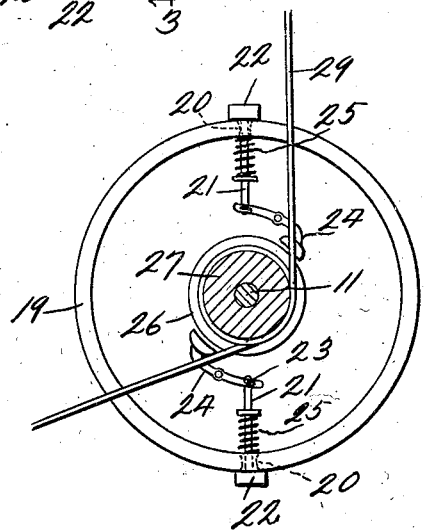
Figure 3 is a vertical transverse sectional view taken on line 3—3 of Figure 2.

Referring to the drawings. the numeral 1 designates a conventional form of windmill tower and 2 the windmill wheel. The wheel 2 is secured to a rotatable shaft 3, which shaft is provided with an arm 4. Pivotally connected to arm 4 at 5, is a connecting rod 6. The lower end of the connecting rod 6 is pivotally connected at 7 to a vertically disposed piston rod 8, which rod is reciprocated vertically during the rotation of the wheel 2. Secured to the piston rod 8 is a rectangular shaped frame 9, which frame reciprocates vertically during the reciprocation of the piston rod 8. Extending transversely through the supporting bars 10 carried by the frame 1 is a horizontally disposed line shaft 11, which line shaft has secured thereto a sprocket 12. Extending around the sprocket 12 and a sprocket 13 carried by the shaft 14 is a sprocket chain 15, which sprocket chain is moved in the direction of the arrow $a$ during the reciprocation of the frame 9, thereby imparting a continuous rotation to the line shaft 11, which may be used for imparting power to auxiliary machinery. Pivotally secured at 16 to the frame 9 at opposite sides thereof are spring actuated dogs 17, which dogs are oppositely disposed, and during the reciprocation of the frame 9 cooperate with the lugs 18 carried by the sprocket chain 15 in such a manner as to impart a continuous rotation to the sprocket chain the direction of the arrow $a$. It will be seen that during the upward movement of the frame 9 that one of the dogs will move the chain upwardly at one side, while the other dog cams pass the lugs on the other side of the chain, and on the downward movement of the frame 9, the operation of the dogs is reversed.

To regulate the speed of rotation of the windwheel 2, during the reciprocation of the frame 9, a clutch wheel 19 is provided, which wheel is secured to the line shaft 11, and rotates therewith. Slidably mounted in bearings 20 of the clutch wheel 19 are radially disposed shafts 21, which shafts have their outer ends provided with weights 22, and their inner ends loosely connected at 23 to pivoted brake shoes 24. The brake shoes are controlled by centrifugal force during the rotation of the clutch wheel 19 against the action of coiled springs 25. It will be seen that when the shafts 21 are moved outwardly against the action of the springs 25 under centrifugal force, the pivoted brake shoes 24 will be moved into engagement with the periphery of the flange 26 of the drum 27, which drum is rotatably mounted on the shaft 11, thereby causing said drum to rotate with the shaft. Connected to the controlling arm 28, which may control a brake or any other mechanism of the windwheel 2, for controlling the speed thereof is a cable 29, which cable extends downwardly and around the drum 27. The cable after passing around the drum 27 has its end connected at 30 to a pivoted lever 31, which lever is provided with a weight 32, whereby the tension or frictional engagement of the cable on the drum 27 may be regulated. It will be seen that if the speed of the line shaft 11 exceeds a predetermined speed, the clutch mechanism will be actuated with considerable force and the drum 27 rotated, thereby imparting a pull on the speed control lever 28 of the windmill, consequently reducing the speed of rotation of the shaft 11.

From the above it will be seen that a windmill is provided with means whereby power may be utilized for driving a line shaft for auxiliary machinery. It will also be seen that the device is simple in construction, and the speed of rotation of the line shaft is controlled through clutch mechanism cooperating with the windwheel.

The invention having been set forth what is claimed as new and useful is:—

1. The combination with a windmill having a reciprocating piston rod, a wind wheel for moving said piston rod, a speed controlling mechanism for controlling the speed of the windwheel, of means for driving the line shaft, said means comprising spaced gears, an endless sprocket chain extending around said sprockets, a frame carried by said piston rod and movable therewith, lugs carried by the sides of the sprocket chain, pivoted dogs carried by the frame and cooperating with said lugs whereby a continuous movement of the sprocket chain in one direction is accomplished upon a reciprocating movement of the frame, a drum loosely mounted on the line shaft, a cable extending around said drum, one end of said cable being connected to the windwheel controlling mechanism, the other end of said cable being connected to a weighted pivoted arm and centrifugally controlled clutch means carried by the line shaft and cooperating with the drum for controlling the wind wheel controlling mechanism.

2. The combination with a windmill comprising a reciprocating piston rod, a wind wheel, mechanism for controlling the speed of the wind wheel, of means for driving a line shaft, said means comprising spaced sprockets, one of said sprockets being carried by the line shaft, a sprocket chain extending over said sprocket, a frame carried by the piston rod, spring actuated pivoted dogs carried by the frame and cooperating with a sprocket chain for imparting a continuous movement in one direction thereto, a drum rotatably mounted on the line shaft, a cable connected to the windwheel controlling mechanism extending around the drum, said cable being connected to a pivoted weighted arm and clutch means controlled by centrifugal force and carried by the line shaft and cooperating with the drum for controlling the windwheel controlling mechanism.

In testimony whereof I hereunto affix my signature.

AMMI J. ROBERTS.